Patented Apr. 22, 1924.

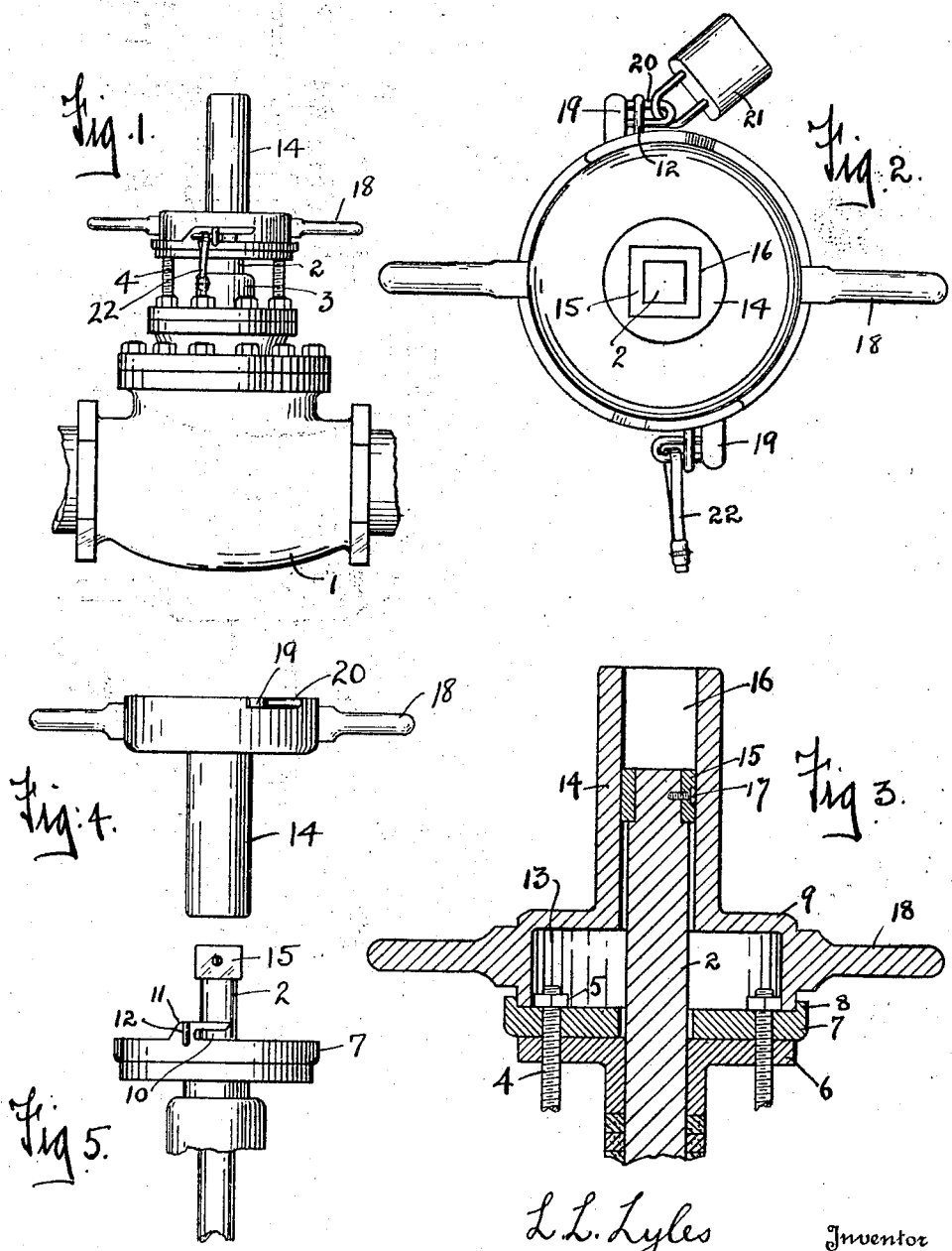

1,491,051

UNITED STATES PATENT OFFICE.

LAWRENCE L. LYLES, OF WEST COLUMBIA, TEXAS.

VALVE LOCK.

Application filed May 3, 1923. Serial No. 636,377.

*To all whom it may concern:*

Be it known that I, LAWRENCE L. LYLES, a citizen of the United States, residing at West Columbia, Brazoria County, Texas, have invented a certain new and useful Improvement in Valve Locks, of which the following is a full, clear, and exact description, such as will enable others skilled in the art to which it appertains to make and use the same.

My invention relates to an improved type of valve locks particularly adapted for use on gate valves on pipe lines, oil tanks, etc.

An object of my invention is to provide a locking device for gate valves and the like which cannot be easily broken and which, if broken or tampered with, will show the fact at once.

Another object is to make a valve lock which may be applied to any ordinary make of valve without material change. It is designed to be of few and simple parts and of substantial construction.

Another object is to construct a lock for valves which, when detached, may also act as a socket wrench in opening the valve.

Referring to the drawing herewith, wherein a preferred embodiment of my invention is disclosed; Fig. 1 is a side elevation of a valve with my device thereon. Fig. 2 is a top plan view thereof. Fig. 3 is a central vertical section through my lock. Fig. 4 is a side elevation of the cap member of my lock inverted for use as a socket wrench; and Fig. 5 is a side elevation of the lower locking plate in position on a valve stem.

Like numerals of reference are applied to like parts in all the views.

In Fig. 1, I have shown an ordinary type of gate valve used in pipe lines. There is a central chamber 1 threaded at each end for attachment in the line. The valve stem 2 extends upwardly from the chamber and has fitted around it a stuffing box 3 the gland of which is tightened when necessary by screws or bolts 4 having nuts 5 on the upper end thereof. The upper end of the gland 6, as shown in Fig. 3, furnishes a seat for my locking plate 7 which has a central opening to fit over the valve stem 2. A slight upward marginal flange 8 serves to form a seat for a locking cap 9 formed to fit therein.

On opposite sides of the plate 7 are slots 10 formed by extending the rim 8 upwardly at 11 for a short distance and recessing the extension on one side. A radially extending staple 12 on each extension 11 is adapted to receive a cooperating staple on the cap.

The cap 9 fits over and protects the upper ends of the bolts 4 and nuts 5 and forms a chamber 13 above them. An upwardly extending sleeve 14 is formed centrally of the upper side. This sleeve is cylindrical on its outer periphery and has a square channel 16 therethrough to fit about a nut or block 15 fitted upon the upper end of the valve stem 2 and secured thereto by means of a countersunk set screw 17. Laterally extending arms 18 are formed on the cap to act as handle in manipulating the valve.

Opposite lugs 19 are formed on the sides of the cap, each lug having a staple 20 formed on one side. The said staples are of suitable size to fit through the staples 12 on the plate and to receive a lock in the forward end thereof, as shown in Fig. 2. I contemplate placing a padlock through one of the staples, when in locking position, and a seal of ordinary construction of sheet metal and lock on the other. The lug 19 on which the locking staple is formed, fits in the slot 10 of the plate and assists in holding the cap in locking position.

In the use of my lock the usual hand wheel upon the valve stem is removed and the nuts 5 unscrewed from the gland bolts 4. The plate 7 which has holes therein to receive the bolts is then placed over the valve stem and bolts and the nuts tightened in place. The nut 15 is then fitted on the upper end of the valve stem, as described. The cap is then fitted over the valve stem and in its seat on the plate 7 with the lugs 19 in position adjacent the plate extensions 11. The cap is then rotated to slide the lugs 19 into the slots 10 and to bring the staples 20 within the staples 12. The padlock 21 and seal 22 are then used to lock the valve.

In unlocking and working the valve, the seal must be broken and the padlock removed. The cap is then released and inverted into the position shown in Fig. 4 and will then form a socket wrench fitting over the nut 15 and serving to rotate the valve stem to open or close the valve.

It will be noted that the sleeve 14 is longer than the valve stem so that, although the end is open, the valve stem cannot be tampered with until the cap is removed. I contemplate casting the cap and lugs in one integral piece. The plate and its locking means will also be an integral member so that the whole device may be cheaply made and of strong and durable construction. The further advantages of my lock will be apparent to one skilled in the art without further description.

What I claim as new is:

1. In a valve lock, a valve stem, a plate fitting about the valve stem, a cap formed to seat on said plate, an upwardly extending sleeve on said cap having a squared channel therethrough, a squared nut on the upper end of said valve stem fitting within said channel, and interengaging staples on said cap and plate whereby a padlock and seal may be employed to lock said cap and plate together.

2. In a valve lock, a valve stem, a plate fitting over said valve stem and secured to the body of the valve, a marginal flange on said plate having opposite slotted extensions thereon, a staple on each said extension, a cap fitting on said plate, a sleeve on said cap to fit over said valve stem, radial lugs on said cap adapted to fit said slotted extensions, and staples on said lugs fitting within the staples on extensions in the manner described.

3. In a valve lock, a valve stem, a circular plate having a central opening to receive said stem, a cap on said plate, a sleeve on said plate to receive said valve stem, means to prevent relative rotation of said sleeve and valve stem, and means to lock said cap to said plate so as to prevent removal of said plate and cap.

4. In a valve lock, a cylindrical valve stem, a polygonal nut thereon, a cap, a central sleeve thereon having a polygonal channel to fit over said nut and valve stem, and means to lock said cap on said valve stem, said sleeve being open at the upper end, whereby it may act as a socket wrench in manipulating said valve stem, in the manner described.

5. In a valve lock, a valve stem, a polygonal nut on the upper end thereof, a plate having a central opening to receive said stem, a cap fitting on said plate, means on said cap to receive said valve stem and to prevent relative rotation between said valve stem and cap, coengaging parts on said plate and cap whereby they may be locked together, and means to secure said plate to the body of said valve adapted to be covered by said cap.

In testimony whereof, I hereunto affix my signature, this 28th day of April, A. D. 1923.

LAWRENCE L. LYLES.